July 13, 1937.　　　T. L. FAWICK　　　2,086,954
CLUTCH
Filed Jan. 18, 1934　　　4 Sheets-Sheet 3

Inventor:
Thomas L. Fawick
By Brown, Jackson, Boettcher & Dienner
Attys.

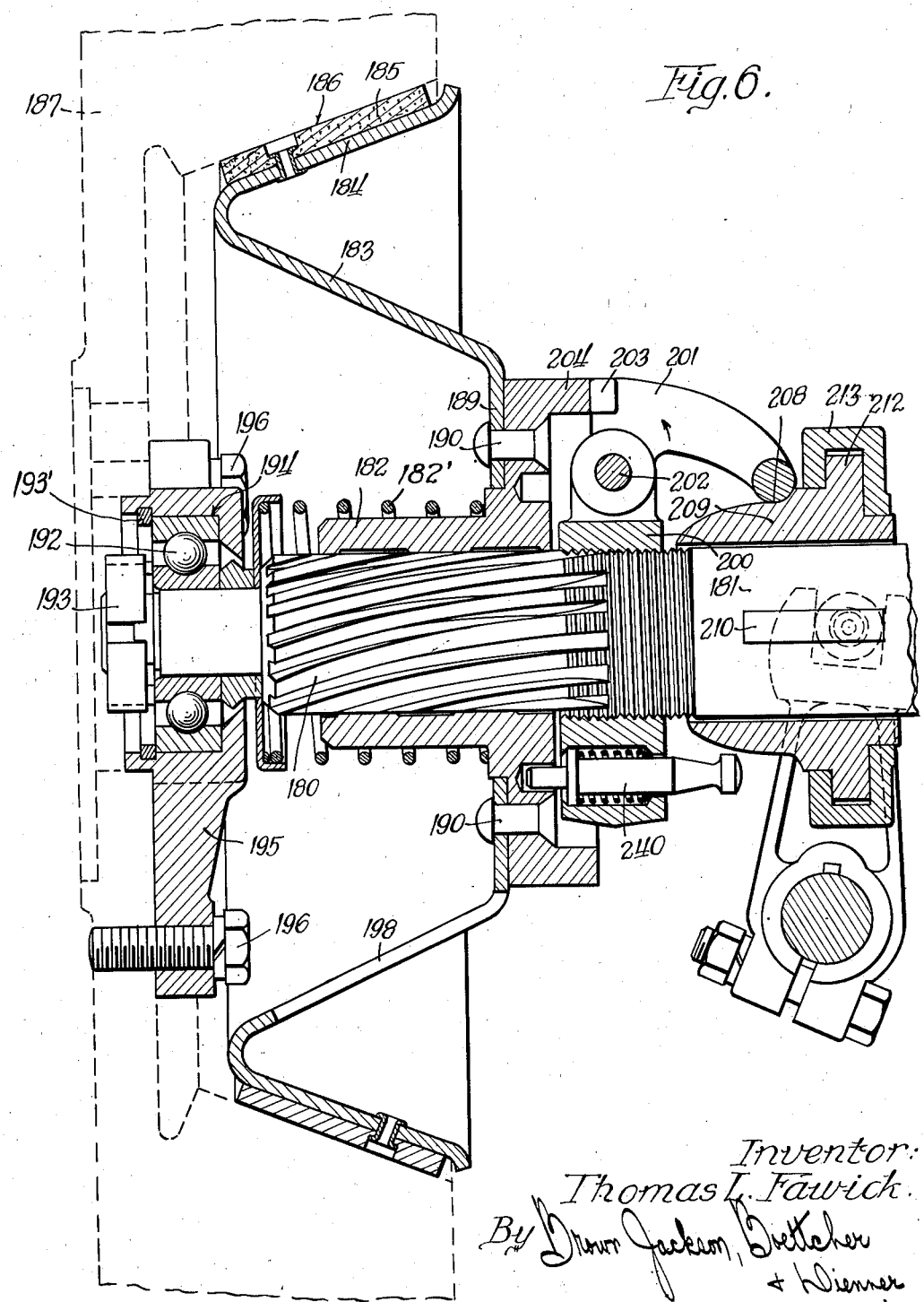

Patented July 13, 1937

2,086,954

UNITED STATES PATENT OFFICE 2,086,954

CLUTCH

Thomas L. Fawick, Akron, Ohio, assignor to Industrial Clutch Company, a corporation of Wisconsin Application January 18, 1934, Serial No. 707,057

13 Claims. (Cl. 192—32)

My invention relates to clutches and the like for connecting and disconnecting driving and driven parts, and more particularly to an improved clutch adapted for use in any type of motor vehicle, such as an automobile, truck, motor bus, farm tractor, locomotive, and the like; also for use for industrial purposes as, for example, in reversing machine tools, and in oil drilling gear units, and elsewhere as suitable or desired.

While I shall show and describe specific embodiments of the invention in cone clutches, it is to be understood that the invention may be embodied in any other type of clutch. And the invention may be embodied in vehicle brakes and brakes for other purposes, all within the scope of the appended claims.

The present invention is applicable to the clutch disclosed and claimed in my copending application Serial No. 642,479, filed November 14, 1932, now Patent 2,020,637, issued November 12, 1935.

The present invention has certain advantages not found in devices of the prior art, first of which is the provision of a servomechanism for utilizing the movement or driving force of the driving member for tending to move the movable clutch member toward engagement with the cooperating clutch member. Binding and stuttering movement of the clutch hub on the shaft, or where an inner hub or gear is employed, as will hereinafter appear, binding and stuttering movement on that hub or gear during engagement of the clutch is eliminated and a smooth easy engagement is obtained. More torque is developed with less pressure of the engaging element, and greater lasting qualities are obtained because the torque is taken or developed at the largest diameter of the clutch, that is, out at the clutch engaging surface. The clutch is light in weight, balanced, and of economical construction. The parts are such as to be readily machined at minimum cost, simple operations and relatively small pieces only being required. The parts are readily assembled and supported when in place, and may be assembled as a unit on a bench assembly and then applied with minimum inconvenience and labor.

The resistance to the endwise movable unit, comprising the clutch hub and clutch element, is taken in the pilot bearing for the clutch shaft, the clutch end of which shaft is preferably anchored in the pilot bearing against axial movement. In one embodiment, the rear bearing is slidable axially in its retainer on the rear of the clutch housing.

In the illustrated embodiments of the invention, I employ a helical splined connection between the clutch hub and the driven shaft for utilizing the movement or driving force of the driving member for tending to move the movable clutch member toward engagement with the cooperating clutch member. As the driven clutch member is engaged with the driving clutch member the driving action of the clutch tends to unscrew the driven clutch member toward and into engagement with the driving clutch member. The helically splined connection not only provides the servoaction, but it reduces the binding action and, thereby, the chattering and grabbing action during the engaging movement.

The helical splined connection may be directly with the clutch shaft or other driven part as in one of the illustrated embodiments of the invention, or it may be with an internal clutch hub or gear member having helical external splines or teeth for engagement with the helical splines or teeth in the outer clutch hub, and straight splines for splined connection with the shaft. Or the inner clutch hub member may be locked to the shaft in any other suitable or preferred manner.

The provision of the internal clutch hub with the helical gear teeth or splines on the outside and straight splines on the inside permits, where the clutch is embodied, for example, in an automobile, the transmission to be lifted away from the clutch without separately disassembling the parts.

Another feature resides in the provision of resilient or yieldable means for taking the axial movement into which the torsional reaction and torsional vibration movement is transferred, and for further preventing chattering of the movable clutch part in engagement of the clutch.

In embodiment of the servoaction of the present invention in a brake, the helical splined connection may be arranged to utilize the turning movement or driving force of the axle spindle by placing such connection between the brake member which is applied and released and a fixed support so that, as the brake member is applied, the driving action of the axle spindle will tend to unscrew the same toward engagement with the brake surface on the wheel and to hold it in engagement with this surface.

Further objects and advantages and the details of the illustrated embodiments of the invention will appear from the following detail description taken in connection with the accompanying drawings, in which:

Figure 6 is a view similar to Figures 1 and 2 and showing another embodiment of the invention;

Figure 7 is a detail view, partially broken away and showing the helical splined connection between the hub of the driven clutch member and the intermediate hub part of the embodiment of Figure 1; and Figure 8 is a detail view, partially broken away, showing the helical splined connection between the hub of the driven clutch member and the intermediate hub part of the embodiment of Figure 2.

Figure 1:
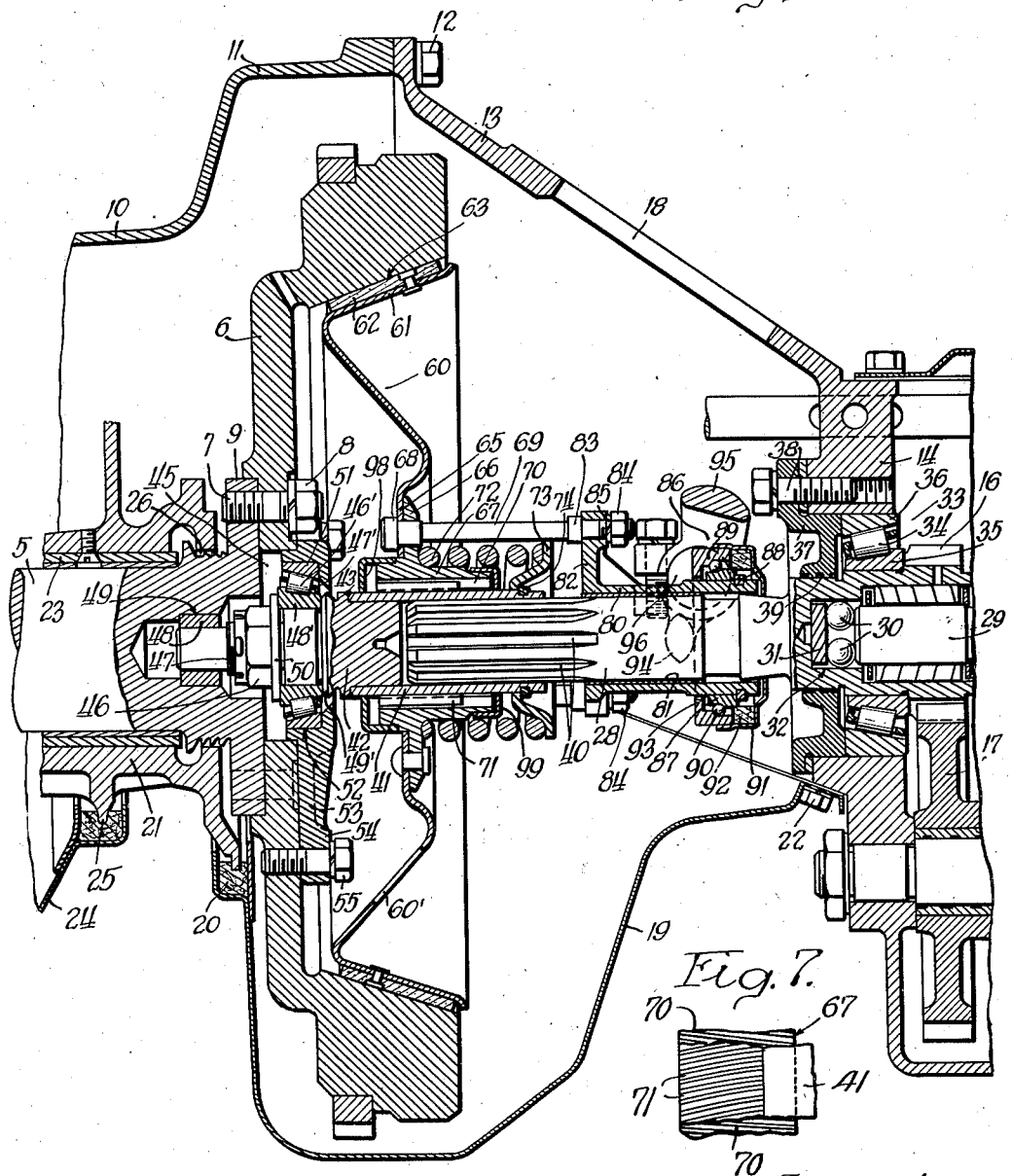
Figure 1 is an axial sectional view through a clutch embodying the present invention.

The embodiment of the invention illustrated in Figure 1 is shown applied to the power plant of an automobile, and the description thereof is directed to the illustrated construction. This embodiment, as well as the other embodiments, may, however, as already explained, be used elsewhere as suitable or desired, and the claims are to be construed accordingly.

Referring to Figure 1, the crank shaft 5 constitutes the driving part and the clutch member 6 which, for convenience of description, will be referred to as the driving clutch member, is mounted upon and secured to the crank shaft 5. In the illustrated embodiment, the clutch member 6 also constitutes the fly-wheel of the engine, although this is not essential. The clutch member 6 is illustrated as being secured to the crank shaft 5 by stud-bolts 7 headed at 8. These secure the clutch member 6 to a flange 9 at the inner end of the crank shaft 5.

The crank case 10 terminates at its rear end in the fly-wheel housing portion 11 to which is bolted at 12 the front end of the clutch housing 13. In the structure illustrated, the clutch housing or clutch cover 13 is formed integral with the forward end of the transmission housing 14 which encloses the usual or any suitable or preferred gearing for accelerating and reversing the vehicle, a portion of which gearing is indicated at 16 and 17. The clutch housing or cover 13 has a hand hole opening 18 which may be provided with a suitable cover (not shown), and the open bottom portions of the clutch housing or cover 13 and the adjacent fly-wheel enclosing portion 11 of the crank case 10 are provided with a suitable bottom pan 19 having oil-sealed connection at 20 to the journal portion 21 of the crank case 10 and bolted at 22 to the casing part 14. The rear end of the crank shaft 5 is rotatably mounted in the main rear crank shaft bearing 23 positioned within the journal portion 21 of the crank case 10. The crank case oil pan 24 is in oil-sealing relation to the journal part 23 at 25, and oil-sealing provision may be made between the crank shaft and the portion 21 at 26.

The clutch shaft 28 is axially alined with the crank shaft 5 and may conveniently be termed the driven shaft, as, in the arrangement illustrated, it is driven from the crank shaft 5. It will be understood, however, that the parts may be arranged so that the shaft 28 may be the driving shaft and the shaft 5 the driven shaft. The clutch member 6 would then be the driven clutch member. In the illustrated arrangement, the rear end of the shaft 28 has thereon the pinion 16 of the transmission device and the forward end of the stub shaft 29 of the transmission is rotatably journaled in the hub portion of this pinion. Thrust ball members 30 and a thrust member 31 are interposed between the forward end of the shaft 29 and the inner end of the bore 32 and, adjacent the teeth of the pinion 16, the rear end of the shaft 28 is journaled in an external radial and axial thrust bearing 33 comprising thrust rollers 34, an inner race 35 having endwise abutting engagement at its rearward end with a shoulder on the shaft 28, and an outer race 36 having endwise abutting engagement at its forward end with a plate 37 secured by bolts 38 to the casing 14 and provided along its hub with oil-sealing grooves 39.

The forward end of the shaft 28 has straight longitudinal splines 40 formed therein, and this splined portion 40 carries a clutch hub 41 provided with straight internal splines engaging with the splines 40 to fix the hub 41 non-rotatably upon the shaft 28. The forward end of the clutch hub 41 is piloted over the rear end of the forward clutch shaft part 42 and is welded at 43 to a flange on this part 42, or otherwise suitably secured thereto. The forward clutch shaft part 42 is journaled rotatably in a radial and axial thrust pilot bearing 45 and is anchored in this pilot bearing 45 against axial movement in one direction by a nut 46 threaded upon the reduced forward extension 47 of the forward clutch shaft part 42, which forward extension 47 is rotatably journaled forward of the nut 46 in a bushing 48 mounted in a bore 49 in the crank shaft 5.

The pilot bearing 45 comprises the rollers 46', a suitable cage 47', an inner race 48' held between a flange 49' on the shaft section 42, and a washer 50 ahead of the nut 46, and an outer race 51 mounted in a bore 52 in a pilot bearing retainer 53, which pilot bearing retainer 53 has arms 54 secured by bolts 55 to the fly-wheel or driving clutch part 6. This anchoring of the forward clutch shaft part 42 in the pilot bearing 45 fixes the forward clutch shaft part 42 and the clutch hub 41 against axial movement in one direction, and, as will hereinafter appear, thus provides for taking the resistance to the endwise movable and driven clutch member 60 in the pilot bearing 45. This is new and constitutes one of the features of the present invention. And, at the same time, the straight splined connection at 40, between the clutch shaft section 28 and the clutch hub 41, permits lifting the transmission away from the clutch or dismounting the transmission without separately disassembling the parts, which is another feature of this embodiment of the present invention.

The driven clutch member 60 is preferably in the form of a stamping of pressed metal, such as steel, aluminum, or the like, although it may be in the form of a casting, or of other suitable or preferred form. This member 60 is provided with an outer conical rim 61, the outer surface of which may be faced with suitable friction material such as leather, asbestos, or the like, as indicated at 62, for frictional engagement with the internal conical driving surface 63 of the fly-wheel or driving clutch member 6. The angle of the surface 63 corresponds with the angle of the outer surface of the clutch facing 62. In cone clutches used in the past, they have been made with this angle from six to twelve degrees inclination, usually around eight degrees, which has required considerable axial movement for disengagement. In the present construction this angle may be very steep, say about eighteen or twenty degrees, as illustrated in the drawings, and thus very little movement is required for complete release of the clutch. And the clutch frees itself quickly and requires very slight endwise clearance. The stamping 60 is inclined rearwardly and inwardly from the forward end of the rim 61, and the rear end of this intermediate inclined portion is dished forwardly to the radially disposed central portion 65 which is held between a flange 66 on an outer clutch hub member 67, and the heads 68 of elongated bolts 69 connected to the means for disengaging the clutch member 60 from the clutch member 6 to be hereinafter described.

The outer clutch hub member 67 has internal helical splines 70 which engage with corresponding external helical splines 71 on the inner clutch hub 41. These splines 70 and 71 need not be so steep as to prevent free and easy engagement of the clutch under the action of the clutch spring 72, and free and easy disengagement under the action of the clutch disengaging means. It is believed that a ten to twenty degree inclination of the splines will be suitable, but this particular inclination is not essential and may be varied widely within the present invention. The further away from the center or axis of the clutch shaft the center of the helical spline is located, the steeper the inclination of this spline may be. The angle of these splines is a function of the load and, of course, the closer the axis of the shaft, the greater the load. That is, the closer the pitch line of the helical teeth is to the center of the shaft, the greater the load, and, therefore, the less the angle.

The clutch engaging spring 72 is mounted over the rearwardly extending tubular part of the clutch hub 67, bearing at its opposite ends against the flange 66 and against a ring 73 secured at 74 against axial movement to the inner axially fixed clutch hub 41. This spring 72 tends to move the hub 67 and, with it, the driven clutch member 60 to the left from the position shown in Figure 1, and thereby the frictionally surfaced rim of the driven clutch member 60 into frictional engagement with the cooperating surface 63 of the driving clutch member 6.

The helically splined connection between the clutch hub 67 and the inner clutch hub 41 provides a servoaction by means of which the turning of the driving clutch member 6 tends, upon engagement of the driven clutch member 60 therewith, to move the movable member 60 into engagement with the member 6. As the conical frictional facing of the member 60 is engaged with the cooperating surface of the member 6, the driving action of the member 6 tends to unscrew the clutch hub 67 toward the fly-wheel or driving member 6, thereby utilizing the rotational movement or driving power of the member 6 to bring about and maintain the application of the clutch. This servoaction tends to develop more torque in the clutch with less pressure of the engaging element, because, when the shaft is under load, the driving action of the clutch tends to unscrew the clutch hub 67 toward the driving clutch member 6, and thereby the driven clutch member 60 into engagement with the clutch surface 63 of the member 6. This servoaction also eliminates binding and stuttering movement of the clutch member 60 and its hub 67 on the clutch shaft or hub part 41 during engagement of the clutch. Smooth and easy engagement is obtained and the clutch is light in weight and balanced and of economical construction. And the lasting qualities are greater because the torque is taken or developed at the largest diameter of the clutch, that is, out at the clutch engaging surfaces 62 and 63.

Any suitable means may be provided for releasing or disengaging the clutch member 60 from the clutch surface 63 of the member 6, and for this purpose I have shown a collar 80 freely slidable and rotatable on the shaft 28, preferably with an intervening bushing 81. The forward end of this collar 80 has radial arms 82 and the bolts 69, which pass through registering openings in the flange 66 and the central portion 65 of the clutch member 60, pass at their rearward ends through these arms 82, and are anchored thereto by shoulders 83, engaging the forward sides of the arms, and nuts 84 threaded upon the rearward ends of the bolts 69 up into cooperation with the rearward sides of the arms 82, preferably with intervening split washers 85. At its rearward end, the collar 80 has fixed thereon an anti-friction thrust bearing 86 comprising an inner race 87 held against rearward movement by a stop 88 engaging in a groove in the collar 80, an outer race 89, and intervening ball-bearings 90. The outer race has a cap 91 secured to its rearward end, preferably with oil-sealing means at 92, and the forward end of this outer race is turned in at 93 for engagement with a finger 94 carried by a suitable operating lever 95, which may be the usual clutch pedal lever. This lever 95 is mounted upon the shaft 96 for pivotal movement in the usual manner.

The operation of the clutch described above is substantially as follows:

As the lever 95 is released, the pressure of the spring 72 which is applied to the hub 67 and transmitted through the flange 66 to the radial central portion of the clutch member 60 forces the frictional face of the rim 61 into frictional engagement with the cooperating surface 63 of the member 6. As the clutch surfaces come into contact, the driven clutch member 60 is rotated by the member 6 and the shaft, being under load, and the inner clutch hub 41 held fixedly against axial movement, the driving action of the clutch tends to unscrew the clutch hub 67 and, with it, the clutch member 60 forwardly from the inner hub 41 and toward and into frictional engagement with the member 6. The clutch member 60 is thus engaged and maintained in frictional engagement with the driving part 6 by the spring 72 and by the servoaction produced by the helical splined connection between the hub 67 and the inner hub 41.

When the clutch is fully engaged, the power is transmitted from the driving surface 63 of the member 6 through the interposed friction material 62 to the conical rim 61 of the clutch member 60. The torque is transmitted from the member 60 to the clutch hub 67 through the bolt connection with the flange 66, and from the hub 67 through the helical splines 70 and 71, inner hub 41, and splines 40, to the shaft 28, from where it is transmitted through the change speed and reversing transmission to the driving wheels or other part or parts which it is desired to drive from the driving part 6. The torsional reaction and torsional vibration movement, instead of acting radially or torsionally, and taken by small springs or the like, is transferred to the helical teeth and taken by axial movement, the helical teeth being adapted to be formed to permit slight sliding movement therebetween. If desired, a rubber, or other suitable yieldable anti-chattering member, may be interposed between the central portion 65 of the clutch member 60 and the flange 66 of the hub member 67, as will hereinafter appear. The torque is obviously developed or taken at the largest diameter of the clutch, that is, at the clutch engaging surfaces 62—63, which makes for greater lasting qualities, and the resulting structure is light in weight, balanced, and of economical construction.

The clutch is released by depressing the clutch pedal in the usual manner which rocks the lever 95 about the axis of the shaft 96 in a counterclockwise direction, as viewed in Figure 1. This movement of the lever 95 causes the finger 94, by engagement with the bearing race or housing part 93, to shift the collar member 80 toward the right (Figure 1) thereby drawing the clutch member 60 out of engagement with the clutch surface of the member 6 and compressing the spring 72. As already pointed out, the helical splines are preferably not so steep as to prevent free and easy disengagement of the clutch and free and easy movement of the clutch member 60 into engagement with the member 6 under the action of the spring 72. When the clutch is to be engaged, the pressure on the pedal is gradually released, thereby permitting the spring 72 to act to shift the clutch member 60 into engagement with the member 6. During engaging movement of the member 60, the helical splines 70 slide on the splines 71, and as the member 60 is engaged with the member 6 the movement of the member 6 is utilized to effect and maintain the engagement of these parts.

In the cone clutches of the prior art, the shiftable cone clutch part has usually been slidably and non-rotatably connected to the driven shaft by straight longitudinal splines. During the operation of engaging the clutch, as soon as the driven clutch part was engaged with the driving clutch part a load was developed which was transmitted to the driven member through these straight splines. This loading of these splines caused a binding action which interfered with free sliding movement of the clutch member so that the effect was for the clutch member to be stopped momentarily by the binding action along the straight splines. The continued release of the clutch spring would, of course, subsequently shift the clutch member along the splines on the driven shaft, but this was accompanied by a jerking movement which, in turn, caused the cooperating frictionally engaging surfaces to engage suddenly with a greater force, causing a still greater jerk. In the old clutches, therefore, the succession of the engaging and releasing of the clutch surfaces and of the clutch member with respect to the splines caused the clutch to chatter and grab during the engaging operation.

With the present invention, the helically splined connection between the driven clutch member and the driven shaft reduces this binding action and thereby the chattering and grabbing action during the engaging operation. The shiftable clutch member has slight rotational movement relative to the driven shaft and, as already explained, at least some of the torsional reaction is transferred into axial movement and at the same time the unscrewing of the shiftable clutch member toward the member 6 by the rotational movement of the member 6 tends to free the shiftable clutch member of any sticking or binding action on the driven shaft or inner hub member and, at the same time, tends more positively and effectively to maintain the clutch surfaces in frictional engagement. Smooth easy engagement is effected and the servoaction tends to develop more torque in the clutch with less pressure of the engaging element. This enables the use of a weaker and lighter clutch engaging spring.

The present invention is not limited to cone clutches, and is adapted for other uses as already explained and will hereinafter further appear. The servoaction in a cone clutch enables, however, increasing the angle of the tapered or conical portion so that still less opportunity is afforded for the grabbing and releasing of the cooperating clutch surfaces. This increased angularity of these surfaces, an example of which has already been given, reduces the axial movement necessary in the shiftable clutch member and, with the provisions described herein, the desired clutch capacity is obtained without adding additional angular clutch surfaces to the clutch members.

The arrangement of the clutch hub 67 and the inner hub 41, together with the spring 72, member 73, and the other parts, permits mounting closure caps 98 and 99 over the opposite ends of the clutch hub 67. These caps have coaxial end openings through which the inner hub 41 extends, and oil-sealing means may be provided between the cap 99 and the adjacent end of the hub 67. An oil or lubricant housing is thus formed about the hub 67 and the cooperating helical splines 70 and 71, which housing may be filled with oil or other suitable lubricant for maintaining these splines lubricated at all times.

The cone stamping or clutch part 60 is provided with openings 60' for access to the bolts 55 for the purpose of fastening the bearing retainer 53 to the fly-wheel or driving part 6 after the clutch unit is brought into assembled relation with respect to the fly-wheel. The arms 54 of the pilot bearing retainer 53 are extended out radially a sufficient distance so that they are in position for access to the fastening bolts 55 through the openings 60'.

If the component of the force of gravity in a direction parallel to the road surface on a down grade, or force due to the momentum of the car, tends to make it travel at a higher speed than that corresponding to the engine speed, the reversed servoaction will tend to screw the endwise movable clutch member 60 out of engagement with the driving clutch member 6, tending thereby to provide, in effect, a free-wheeling action at such time. This action will be automatic and will be obtained in a highly simple and effective manner.

Figure 2:
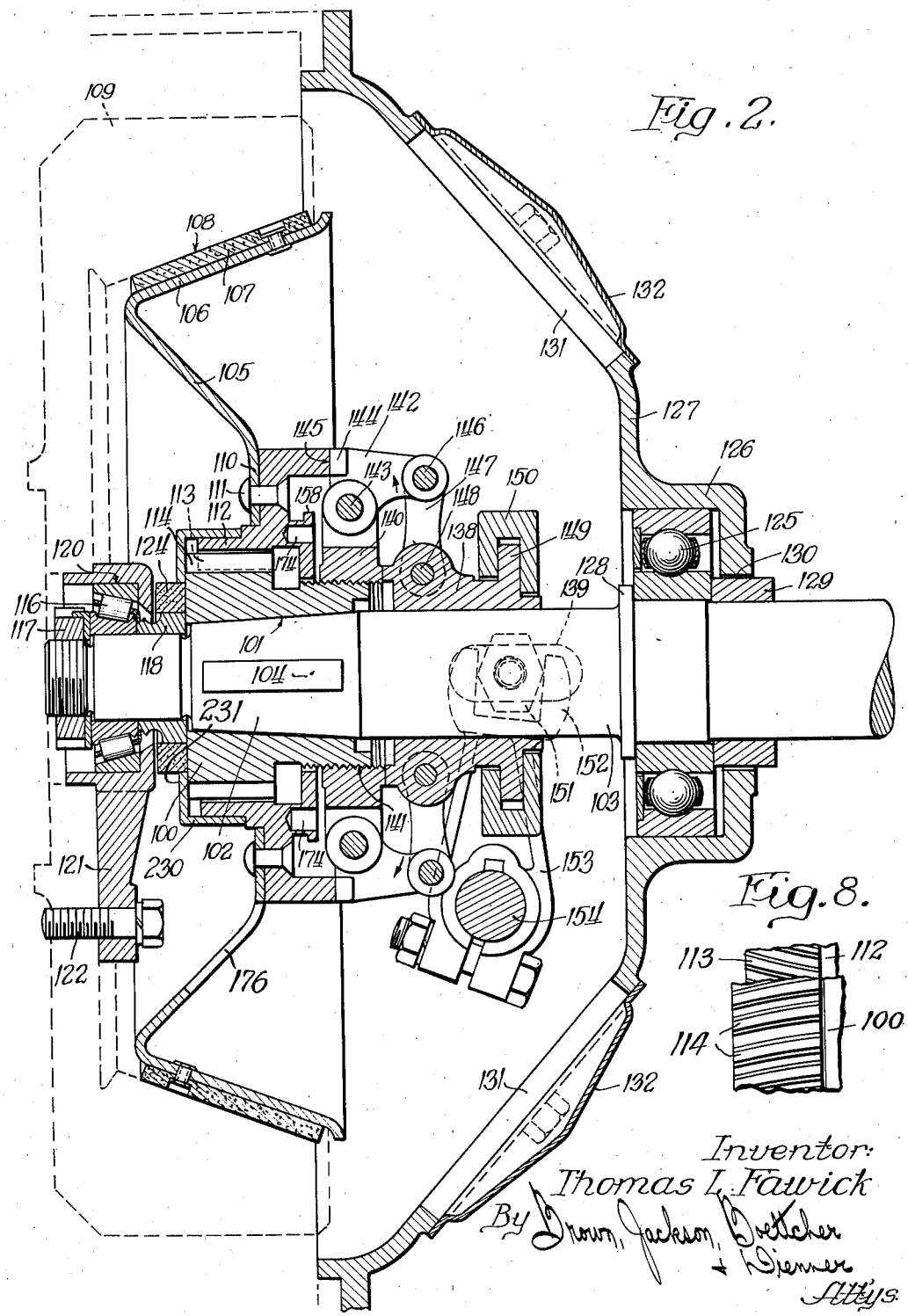
Figure 2 is a similar view through another embodiment of the invention.

The embodiment of the invention illustrated in Figure 2 is especially adapted for industrial purposes, for example, for reversing machine tools, oil-drilling gear units, and like apparatus, but it is to be understood that this embodiment, like the other embodiments, may be used for automotive purposes or elsewhere as suitable or desired.

Referring now to Figure 2, the clutch hub 100 in this case has a tapered or conical bore 101 mounted upon and locked to the conical portion 102 of the clutch shaft 103, there being preferably a straight splined driving connection 104 between the conical portion 102 of the shaft 103 and the clutch hub 100.

The driven clutch member 105 which, as before, is preferably in the form of a stamping of pressed metal, such as steel, aluminum, or the like, although it may be in the form of a casting, or in any other suitable or preferred form, is provided with the outer conical rim 106, the outer surface of which may be faced with suitable friction material at 107, similar to the preceding embodiment, for frictional engagement with the internal conical driving surface 108 of the fly-wheel or driving clutch member 109. The angularity of the cooperating conical surfaces is preferably steeper than that usually provided in clutches of this sort, and, in the illustrated embodiment, is shown substantially the same as the angularity illustrated and described in connection with the preceding embodiment. The clutch member 105 is inclined rearwardly from the forward end of the conical rim 106 and terminates in the radial central portion 110 disposed, as before, within the confines of the conical rim. The central portion 110 is secured as by means of rivets 111 to an outer clutch hub member 112 which is provided internally with helical splines 113 which engage with corresponding external helical splines 114 on the inner clutch hub 100. The internal helical splines 113 are formed on the inside of the outer sleeve 112 at the forward end thereof, and the cooperating external helical splines 114 are formed on the outside of the inner clutch hub 100 at the forward end of this inner hub. These helical splines may be of about the angularity described in connection with the preceding embodiment, and are preferably not so steep as to prevent free and easy disengagement under the spring means when the clutch is released. As before, the further away from the center or axis of the clutch shaft the center of the helical spline is located, the steeper the inclination of this spline may be. The angle of these splines is a function of the load and, of course, the closer the axis of the shaft, the greater the load. That is, the closer the pitch line of the helical teeth is to the center of the shaft, the greater the load, and, therefore, the less the angle.

The forward end of the clutch shaft 103 is journaled rotatably in a radial and axial thrust pilot bearing 116 and is anchored in this pilot bearing 116 against axial movement in one direction as by means of a nut 117 threaded upon the reduced forward end of the shaft 103. The pilot bearing 116, which comprises an inner race held between the nut 117 and a collar 118 interposed between the inner race of the bearing 116 and the forward end of the clutch hub 100, is mounted in a bore 120 in a pilot bearing retainer 121. This bearing retainer 121 has arms secured by bolts 122 to the flywheel or driving clutch part 109. As before, the anchoring of the forward end of the clutch shaft 103 against axial movement in the pilot bearing 116 provides for taking the resistance to the endwise movable and driven clutch member in the pilot bearing 116. An annular carbon collar 124 may be mounted upon the member 118 between the forward end of the clutch hub 100 and the adjacent end of the retainer 121.

The rear bearing 125 for the clutch shaft 103 is mounted in the retainer 126, which retainer 126 is preferably formed integral with the clutch housing or clutch cover part 127, the inner race of the bearing 125 being held between a flange 128 on the shaft 103 and a collar 129 which operates slidingly in an end opening 130 in the retainer 126. The clutch housing 127 has hand hole openings 131 which may be provided with suitable covers 132 and the forward end of this housing 127 may be bolted or otherwise suitably secured to the crank case or other housing part (not shown) enclosing the driving clutch member 109.

For moving the clutch member 105 into engagement with the clutch member 109 I provide a collar 138 freely slidable upon and keyed at 139 for rotation with the shaft 103, and a second collar 140 threaded at 141 upon the rearward end of the clutch hub 100. Levers 142 pivoted at 143 to the collar 140 have shoulders 144 for abutment with the rim 145 of the outer clutch hub 112, and these levers 142 have arms pivoted at 146 to links 147, which links 147 are pivoted at 148 to the collar 138. The collar 138 has a flange 149 freely rotatable in a grooved shifter ring 150, which ring 150 has diametrically opposite bosses 151 engaged by forked arms 152 of the shifter fork 153 mounted upon the shifter shaft 154. This shaft 154 may be provided with the usual or any suitable operating lever (not shown) for turning the shaft to swing the shifter fork 153 to engage and hold the clutch in engagement.

Figure 3:
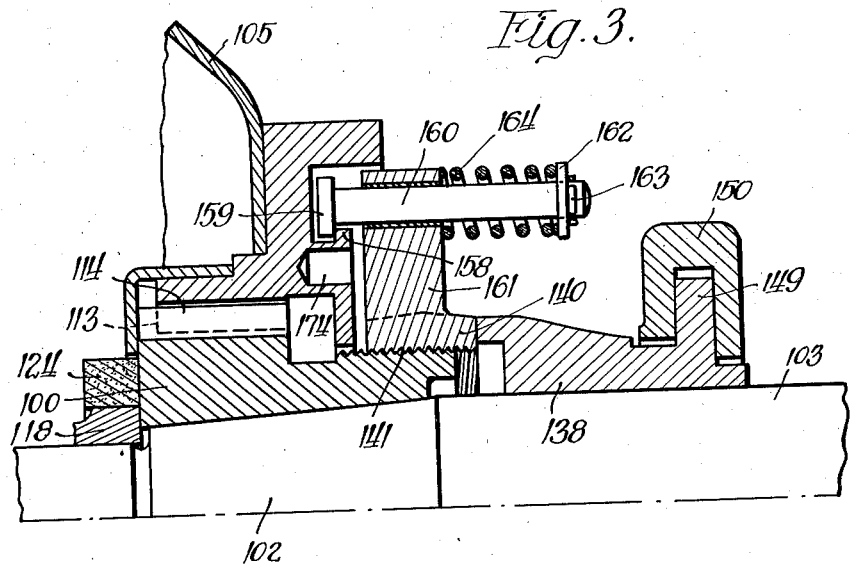
Figure 3 is a fragmentary detail section showing the spring release for the clutch illustrated in Figure 2.

The clutch shown in Figure 2 is spring-released. For this purpose the outer clutch hub 112 is provided with an annular shoulder 158 which, as shown in Figure 3, is engaged by the heads 159 of two diametrically opposite pins 160. These pins 160 pass through openings in radial lugs 161 on the collar 140, and encircling each pin and biased or interposed between the adjacent lug 161 and a washer 162 held at the rearward end of the pin, as by means of a cotter pin 163, is a coiled clutch releasing or retracting spring 164. It is to be understood that more than two of these spring release devices may be provided and that the particular spring release may be varied widely within the scope of the present invention.

The operation of the clutch shown in Figure 2 is substantially as follows:

As the shifter fork 153 or shaft 154 is released the pressure of the springs 164, which is supplied to the outer clutch hub 112 and transmitted to the clutch member 105, withdraws the clutch member 105 to the right from the position shown in Figure 2 and disengages the clutch surface thereof from the cooperating clutch surface of the member 109. This disengagement is accompanied by a shifting movement of the clutch hub 112 along the helical splines 114 of the clutch hub 100 and, as already pointed out, the helical splines are preferably not so steep as to prevent free and easy disengagement under the spring means when the clutch is released.

The clutch is engaged and held in engagement by operating the shifter fork 153 to shift the collar 138 to the left as viewed in Figure 2. This swings the inner ends of the links 147 to the left which, in turn, swings the levers 142 in the directions indicated by the arrows. This swinging movement of these levers 142 by the engagement of their shouldered portions 144 with the rim 145 of the hub 112 forces the clutch member 105 into engagement with the clutch member 109 and holds the same in engagement therewith so long as the clutch engaging pressure is applied to the fork 153. As before, as the clutch surfaces come into contact, the driven clutch member 105 is rotated by the driving member 109, and the shaft being under load and the clutch hub 100 anchored fixedly against axial movement, the driving action of the clutch tends to unscrew the clutch hub 112 and, with it, the clutch member 105 forwardly from the hub 100 and toward and into frictional engagement with the clutch surface of the member 109. The clutch member 105 is thus engaged and maintained in frictional engagement with the driving part 109 by the shifter means and by the servoaction produced by the helical splined connection between the outer hub 112 and the inner clutch hub 100.

As before, when the clutch is fully engaged the power is transmitted from the driving surface 108 of the member 109 through the interposed friction material 107 to the conical rim 106 of the clutch member 105. The torque is transmitted from the member 105 to the clutch hub 112 through the connection between these parts, and from the hub 112 through the helical splines 113 and 114 and inner hub 100 to the shaft 103, from where it is transmitted for industrial purposes or otherwise as desired. Binding and stuttering movement of the shiftable clutch member during engagement of the clutch is eliminated, and a smooth, easy engagement of the clutch is obtained. The servoaction tends to develop more torque in the clutch with less pressure of the engaging element, and the clutch is of light weight, balanced and of economical construction.

As before, the lasting qualities are greater because the torque is taken or developed at the largest diameter of the clutch, that is, out at the clutch engaging surface, and the torsional reaction and torsional vibration movement, instead of acting radially or torsionally and taken by small springs or the like, is transferred to the helical teeth and taken by axial movement, the helical teeth being adapted, as before, to be formed to permit slight sliding movement therebetween. If desired, a rubber or other suitable yieldable anti-chattering member may be interposed between the central portion 110 of the clutch member 105 and the outer hub member 112, as will hereinafter appear.

For the purpose of adjusting the clutch shown in Figure 2, a pin 170 extends through an opening in the collar 140 and has a flange 171 operating in a bore in this member, between which flange and the bottom of the bore a spring 172 is confined. The forward end of the pin 170 is reduced at 173 for engagement selectively in sockets 174 formed in the outer clutch hub 112 and circumferentially spaced about the axis thereof. The engagement of the pin 170 in a socket 174 locks the collar 140 with respect to the outer clutch hub 112, and by grasping the rearward end of this pin, withdrawing it from the socket, and turning the collar 140 on the hub 100 to position in which the pin will engage another socket 174 and engaging the pin in the other socket, the collar 140 is locked in different axial positions. By this arrangement, the pivots 143 for the levers 142 are shifted axially to adjust the engaging and disengaging action of the clutch. The pin 170 has sufficient play or freedom in the respective sockets 174 to allow for the limited rotative movement of the outer clutch hub 112 with respect to the inner hub.

As before, the cone stamping or shiftable clutch part 105 has openings 176 for access to the bolts 122 for the purpose of fastening the bearing retainer 121 to the fly-wheel or driving part 109 after the clutch unit is brought into assembled relation with respect to the fly-wheel. The arms of the pilot bearing retainer are extended out radially a sufficient distance so that the bolts 122 are in position for access through the openings 176 in the clutch member 105.

Figure 5:
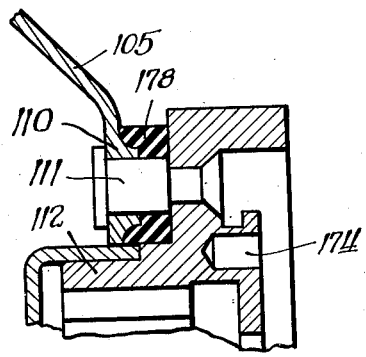
Figure 5 is a fragmentary detail section showing a resilient anti-chattering member between the endwise movable clutch member and the clutch hub therefor.

The additional means for taking the axial movement into which the torsional reaction and torsional vibration movement is transferred and to prevent further chattering of the movable clutch part in engaging the clutch is illustrated in Figure 5. The illustrated means comprises an annular rubber or other suitable resilient ring 178 interposed between the central radial part 110 of the clutch member 105 and the adjacent radially extending portion of the outer clutch hub 112. This provision is shown applied to the structure illustrated in Figure 2 with the fastening devices 111 extending through openings in the resilient ring 178, but it is to be understood that this resilient reaction absorbing and anti-chattering means may be employed in the embodiment of Figure 1, or in any of the other embodiments of the present invention.

A cap 230, mounted over the forward end of the clutch hub 112, and an integral inwardly extending flange 231, at the forward end of the hub 112, forms an oil or other lubricant enclosure about the cooperating helical splines 113 and 114 for maintaining these splines lubricated at all times.

In the embodiment of Figure 6 the helical splines 180 are formed directly in the clutch shaft 181 and the clutch hub 182 is mounted directly upon the helically splined portion 180 of the shaft 181 and provided with internal helical splines 180 corresponding with the splines 180 and in engagement therewith. The driven clutch member 183, which, as in the preceding embodiments, is preferably in the form of a stamping of pressed metal such as steel, aluminum, or the like, although it may be in the form of a casting, or in any other suitable or preferred form, is provided with the outer conical rim 184, the outer surface of which may be faced with suitable friction material at 185, similar to the preceding embodiment, for frictional engagement with the internal conical driving surface 186 of the flywheel or driving clutch member 187.

As before, the angularity of the cooperating conical surface is preferably steeper than that usually provided in clutches of this sort, and, in the illustrated embodiment, is shown substantially the same as the angularity illustrated and described in connection with the embodiment shown in Figure 1. The clutch member 183 is inclined rearwardly and inwardly from the forward end of the conical rim 184 and terminates in the radial central portion 189 which is secured as by means of rivets 190 to the clutch hub 182. The helical splines 180 may be of about the angularity described in connection with the preceding embodiments, and are preferably not so steep as to prevent free and easy disengagement and engagement of the clutch.

The forward end of the clutch shaft 181 is journaled rotatably in an anti-friction bearing 192 which constitutes a pilot bearing for the forward end of the shaft 181 and is anchored in this pilot bearing 192 against axial movement as by means of a nut 193. The pilot bearing 192, which comprises an inner race held between the nut 193 and the collar interposed between the shoulder formed by the enlarged splined portion 180 of the shaft and the inner race of the bearing 192, is mounted in a bore 194 in a pilot bearing retainer 195. A retainer ring 193', fitted into an annular channel in the bore of the retainer 195, serves to prevent axial movement of the shaft 181 to the left (Figure 6). This bearing retainer 195 has arms secured by bolts 196 to the fly-wheel or driving clutch part 187. The anchoring of the forward reduced end of the clutch shaft 181 against axial movement in the pilot bearing 192 provides for taking the resistance to the endwise movable and driven clutch member in the pilot bearing 192. The cone stamping or cone clutch part 183 has openings 198 for access to the bolts 196 for the purpose of fastening the bearing retainer 195 to the fly-wheel after the clutch unit is brought into assembled relation with respect to the fly-wheel. The arms of the pilot bearing retainer are extended out radially a sufficient distance so that they are in position for access to the fastening bolts 196 through the openings 198 in the cone clutch member 183.

The collar 200, which corresponds with the collar 140 of the previous embodiment, is, in this case, threaded directly upon the clutch shaft 181. Levers 201, pivoted at 202 to the collar 200, have shoulders 203 for abutment with the rim 204 of the clutch hub 182, and these levers 201 have arms engaging at 208 a collar 209 shiftable axially along the shaft 181 but keyed at 210 for rotation therewith. The collar 209 has a flange 212 freely rotatable in a grooved shifter ring 213 which is shifted axially along the shaft 181 by shifter means similar to that described in connection with the previous embodiment, or by any standard well-known shifter means.

The operation of this embodiment of the invention is similar to the operation of the preceding embodiment. When the collar 209 is shifted to the left as viewed in Figure 6, the levers 201 are swung about their pivots 202 in the directions indicated by the arrows, and the engagement of the shoulders at 203 with the rim 204 of the clutch hub 182 forces this hub and the cone clutch member 183, carried thereby, to the left along the helical splines 180 and into frictional engagement with the clutch surface 186 of the driving clutch member 187. And upon release of the shifter means for engaging and holding the clutch in engagement, the endwise movable clutch member 183 is retracted or shifted out of engagement with the clutch member 187 to the right, as viewed in Figure 6, by a suitable retractor spring 182'.

Figure 4:
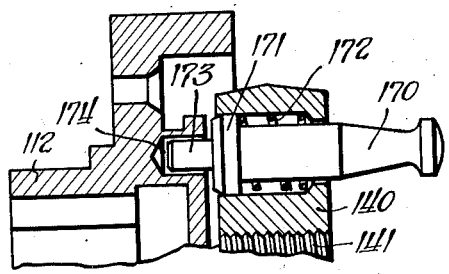
Figure 4 is a fragmentary detail section showing a clutch adjustment for the embodiment of Figure 2.

Adjusting means 240, of the form described in connection with Figure 4, or of any other suitable or preferred form, may be provided for adjusting the clutch shown in Figure 6. The manner of adjusting the clutch with the particular adjusting means shown has been previously described and will not be repeated in connection with this embodiment of the invention.

I claim:

1. In combination, a driving member, a member movable endwise into frictional engagement with said driving member, a third member, a longitudinal helically splined connection between said endwise movable member and said third member arranged to utilize the turning of the driving member for tending to move the movable member endwise toward engagement with the driving member, and a lubricant enclosure for holding lubricant directly adjacent said longitudinal helically splined connection.

2. In combination, a driving part having a driving clutch surface, a driven part anchored against axial movement, an inner hub member fixed to rotate with said driven part, a clutch member movable into and out of engagement with the driving clutch surface and including a hub part having a longitudinal helically splined connection with the inner hub member, and means closing the ends of the hub part of said movable clutch member to form a lubricant enclosure for said longitudinal helically splined connection.

3. In a friction clutch, a driving member having a conical clutch surface, a coaxial driven member, a driven clutch member having an outer conical rim of an angularity conforming with the angularity of the conical clutch surface of the driving member and faced with friction material for frictional engagement with said surface, a central hub member constituting a rigid part of said driven clutch member and having longitudinal helically splined connection with said driven member, said longitudinal helically splined connection being of slight angularity and disposed close to the axis of said driving and driven members, a pilot bearing for taking the axial thrust of the driven member at the axis of said driving member, and a thin connecting web between the rim of the driven clutch member and the hub member, said web being axially flexible and sloped reversely to the conical form of the rim to stiffen the web sufficiently to impart the action of said helically splined connection to the rim.

4. In a friction clutch, a driving member having a clutch surface, a clutch shaft part anchored against axial movement in one direction in said driving member and having a hub part provided internally with straight longitudinal splines and externally with longitudinal helical splines, a second shaft part having straight longitudinal splines engaging the straight longitudinal splines internally of said hub part and adapted to be removed from engagement therewith without otherwise dismantling the clutch, a driven clutch member having a clutch surface for frictional engagement with the clutch surface of said driving member, a central hub member constituting a rigid part of said driven clutch member and having longitudinal helical splines internally thereof for engagement with the longitudinal helical splines externally of the hub of said first clutch shaft part, abutment means on the hub of said first clutch shaft part, and a spring acting against said abutment means and against said driven clutch member for moving said driven clutch member into engagement with the clutch surface of said driving member.

5. In a friction clutch, a driving member having a clutch surface, a driven clutch member engageable therewith and having a hub part, a driven shaft, an intermediate hub part having a small diameter longitudinal helical splined connection with the hub part of said driven clutch member and longitudinal straight splined connection with said driven shaft, said helical splined and straight splined connection both disposed in close proximity to the axis of said driven shaft, abutment means on said intermediate hub part, and a spring acting against said abutment means and against said driven clutch member for moving said driven clutch member into engagement with the clutch surface of said driving member.

6. In a friction clutch, a driving member having a clutch surface, a driven clutch member engageable therewith and having a hub part, a driven shaft, an intermediate hub part having a small diameter longitudinal helical splined connection with the hub part of said driven clutch member and longitudinal straight splined connection with said driven shaft, said helical splined and straight splined connections both disposed in close proximity to the axis of said driven shaft, and means at the ends of the hub part of said driven clutch member forming a lubricant chamber for said helical splined connection.

7. In a friction clutch, a driving member, a flywheel bolted to said member and having an internal conical clutch surface, a thrust bearing within the bolted attachment of the flywheel to said driving member, a driven shaft anchored against axial movement in one direction in said thrust bearing, a hub part, a small diameter helically splined connection of slight angularity between said hub part and said driven shaft, a driven clutch member comprising a thin pressed metal stamping having an outer conical rim of an angularity conforming with the angularity of the conical clutch surface of said driving member and faced with friction material for frictional engagement with said surface, and an axially flexible thin connecting web formed as a part of said stamping and integral with the rim thereof, said connecting web being held at its inner periphery to said hub part and sloping reversely to the conical rim to stiffen the web sufficiently to take the action of said helically splined connection.

8. In a friction clutch, a driving member, a fly-wheel bolted to said member and having an internal conical clutch surface, a thrust bearing within the bolted attachment of the flywheel to said driving member, a driven shaft anchored against axial movement in one direction in said thrust bearing, a hub part, a small diameter helically splined connection of slight angularity between said hub part and said driven shaft, a driven clutch member comprising a thin pressed metal stamping having an outer conical rim of an angularity conforming with the angularity of the conical clutch surface of said driving member and faced with friction material for frictional engagement with said surface, an axially flexible thin connecting web formed as a part of said stamping and integral with the rim thereof, said connecting web being held at its inner periphery to said hub part and sloping reversely to the conical rim to stiffen the web sufficiently to take the action of said helically splined connection, an abutment on the driven shaft, and a coiled spring encircling the driven shaft and confined between the hub part and said abutment for thrusting the driven clutch member into engagement with the clutch surface of the flywheel.

9. In combination, a driving part having a driving clutch surface, a pilot bearing on said driving part, a driven shaft part rotatably journaled and anchored against axial movement in said pilot bearing and having an inner hub part, a second driven shaft part fitting telescopically into said inner hub part of said first driven shaft part and having straight external splines engaging straight internal splines in said hub part, a driven clutch member movable into and out of engagement with said driving clutch surface, an outer hub part for said driven clutch member fitting over the inner hub part of the driven shaft and having internal helical splines engaging external helical splines on the driven shaft hub part, abutment means on said inner hub part, and a spring acting against said abutment means and against said driven clutch member for moving said driven clutch member into engagement with the clutch surface of said driving member.

10. In combination, a driving shaft, a flywheel secured to said shaft and having an internal conical clutch surface, a coaxial driven shaft, a hub part, a small diameter helically splined connection of slight angularity between said hub part and said driven shaft, a driven clutch member comprising a thin stamping having an outer conical rim of an angularity conforming with the angularity of the conical clutch surface of said driving member and faced with friction material for frictional engagement with said surface, and a thin connecting web formed as a part of said stamping and integral with the rim thereof, said connecting web being held at its inner periphery to said hub part and sloping reversely to the conical rim to stiffen the web sufficiently to take the action of said helically splined connection.

11. In a friction clutch, a driving member having a conical clutch surface, a coaxial driven member, a driven clutch member having an outer conical rim of an angularity conforming with the angularity of the conical clutch surface of the driving member and faced with friction material for frictional engagement with said surface, a central hub member constituting a rigid part of said driven clutch member and having longitudinal helically splined connection with said driven member, said longitudinal helically splined connection being of slight angularity and disposed close to the axis of said driving and driven members, and a thin connecting web between the rim of the driven clutch member and the hub member, said web being sloped reversely to the conical form of the rim to stiffen the web sufficiently to impart the action of said helically splined connection to the rim.

12. A friction clutch comprising, in combination, a driving clutch member having an internal conical clutch surface of relatively large diameter, driven shaft means having a relatively small diameter journaled in said driving clutch member; an external helical spline on said driven shaft means within the confines of the internal conical surface of said driving clutch member, said helical spline having a relatively small pitch and a diameter slightly greater than the diameter of said driven shaft means; a driven clutch member having an external conical clutch surface for engaging said internal conical clutch surface of said driving clutch member, a hub at the center of said driven clutch member, an internal helical spline on said hub cooperating with said external helical spline within said confines of said internal conical surface of said driving clutch member for moving said clutch surfaces into mutual engagement when power is applied to said driving clutch member, spring means interposed between said driven clutch member and said driven shaft means for biasing said clutch surfaces out of mutual engagement against the action of said helical splines, and means operatively engaging said driven clutch member and assisted by the action of said helical splines for moving said clutch members into driving engagement against the biasing force of said spring means.

13. The combination with a conical driving clutch member and a driven shaft piloted thereon of a conical driven clutch member mounted coaxially with said driven shaft for driving engagement with said driving clutch member, an external helical spline on said driven shaft, a hub on said driven clutch member extending outwardly therefrom, an internal helical spline in said hub engaging said external helical spline for moving said clutch member into driving engagement, a ring carried by said driven shaft, a compression spring interposed between said ring and said hub and surrounding the outwardly extending portion thereof for biasing said clutch members into driving engagement in addition to the action of said helical splines, and means for moving said clutch members out of driving engagement against the action of said helical splines and spring.

THOMAS L. FAWICK.